United States Patent [19]

Steves, Jr. et al.

[11] Patent Number: 5,230,598
[45] Date of Patent: Jul. 27, 1993

[54] TIRE AND WHEEL HANDLING DEVICE

[76] Inventors: Frank Steves, Jr., 1077 Marsh Creek Ln., Menteca, Calif. 95336; Jeff M. Steves, 2509 Oakhurst; Brett V. Steves, 868 Ridgeview Ct., both of Oakdale, Calif. 95361

[21] Appl. No.: 826,606

[22] Filed: Jan. 28, 1992

[51] Int. Cl.$^5$ .............................................. B60B 29/00
[52] U.S. Cl. ................................ 414/427; 254/2 R; 414/590; 414/665; 414/672; 414/744.3
[58] Field of Search ............... 414/426, 427, 672, 590, 414/744.3, 744.5, 662–665, 668, 669; 254/2 R, 2 B, 2 C; 29/273

[56] References Cited

U.S. PATENT DOCUMENTS

| | | | |
|---|---|---|---|
| 1,964,119 | 6/1934 | Hendry | 254/2 R X |
| 2,189,010 | 2/1940 | Lewis | 254/2 R |
| 2,539,274 | 1/1951 | Sagen | 414/426 |
| 2,695,717 | 11/1954 | Crow | 414/426 |
| 2,852,151 | 9/1958 | Smith | 414/590 X |
| 2,903,049 | 9/1959 | Carlson | 414/427 X |
| 3,258,146 | 6/1966 | Hamilton | 414/427 X |
| 3,301,419 | 1/1967 | Molen et al. | 414/428 |
| 3,491,427 | 1/1970 | Zimmerman et al. | 414/426 X |
| 3,685,125 | 8/1972 | DePierre | 414/427 X |
| 3,749,265 | 7/1973 | Smith | 414/427 |
| 3,951,287 | 4/1976 | Cofer | 414/427 |
| 4,123,038 | 10/1978 | Meyers | 254/2 R |
| 4,684,310 | 8/1987 | Stange | 414/590 X |
| 4,930,966 | 6/1990 | Chien | 414/427 |
| 5,007,789 | 4/1991 | Painter | 414/426 X |

*Primary Examiner*—David A. Bucci
*Attorney, Agent, or Firm*—Jacobson, Price, Holman & Stern

[57] ABSTRACT

A vehicle tire and wheel handling device in the form of a pair of tire and wheel receiving cradles or supports for receiving, supporting and handling vehicle tires and wheels when a vehicle is on a hoist in elevated position to facilitate the tires and wheels being "rotated", that is, being switched from one position on the vehicle to another position. Each cradle or support includes spaced parallel side support members interconnected by end rollers to cradle and receive a substantial portion of the periphery of a tire and wheel assembly in order to engage and support the wheel as it is removed from a wheel hub and maintain it supported in generally an upright position while the wheel is moved from a position adjacent one hub of the vehicle to a position adjacent another hub of the vehicle so that the tire and wheel assembly can be remounted on the vehicle on a different hub from which it was removed. The cradles or supports are rotatably mounted for swivelling about vertical axes on a support beam or arm that is centrally supported for swivelling or rotatable movement about a vertical axis to facilitate the tire and wheel assemblies being rotated or switched from one position to another on the vehicle and specifically to switch the tire and wheel assemblies between the front and rear hubs on the same side of the vehicle.

5 Claims, 2 Drawing Sheets

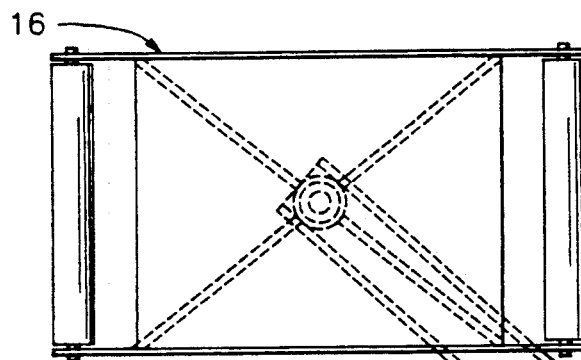
FIG. 3
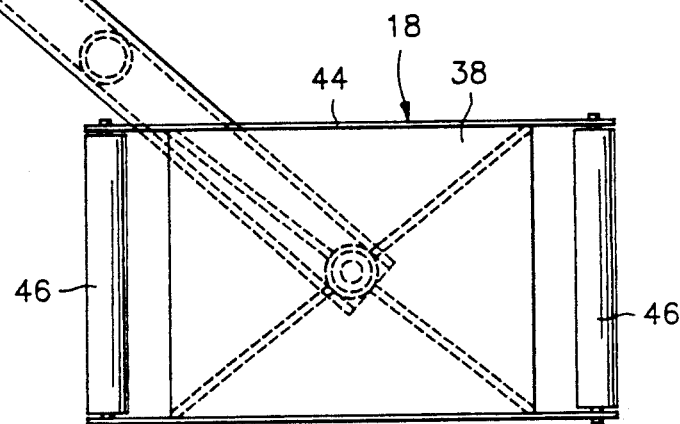
FIG. 4A
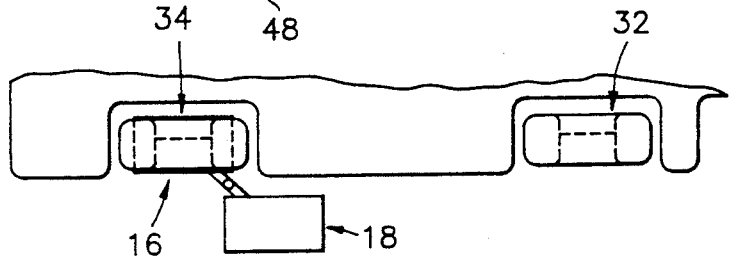
FIG. 4B
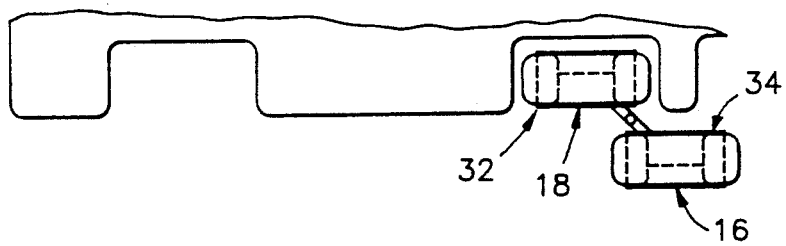
FIG. 4C
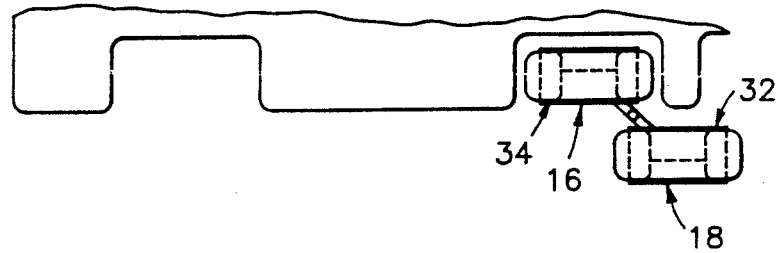
FIG. 4D
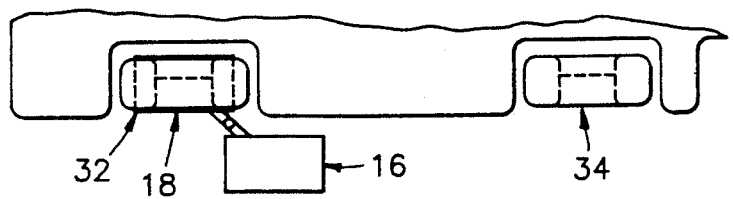

TIRE AND WHEEL HANDLING DEVICE

BACKGROUND OF THE INVENTION

1. Field of the Invention

The present invention generally relates to a vehicle tire and wheel handling device in the form of a pair of tire and wheel receiving cradles or supports for receiving, supporting and handling vehicle tires and wheels when a vehicle is on a hoist in elevated position to facilitate the tires and wheels being "rotated", that is, being switched from one position on the vehicle to another position. Each cradle or support includes spaced parallel side support members interconnected by end rollers to cradle and receive a substantial portion of the periphery of a tire and wheel assembly in order to engage and support the wheel as it is removed from a wheel hub and maintain it supported in generally an upright position while the wheel is moved from a position adjacent one hub of the vehicle to a position adjacent another hub of the vehicle so that the tire and wheel assembly can be remounted on the vehicle on a different hub from which it was removed. The cradles or supports are rotatably mounted for swivelling about vertical axes on a support beam or arm that is centrally supported for swivelling or rotatable movement about a vertical axis to facilitate the tire and wheel assemblies being rotated or switched from one position to another on the vehicle and specifically to switch the tire and wheel assemblies between the front and rear hubs on the same side of the vehicle.

2. Description of the Prior Art

Vehicle tires and wheels are normally "rotated" or switched from one position to another in relation to a vehicle to prolong the effective wear life of the tires by obtaining maximum tread life by evening the wear characteristics on the tires on a vehicle. Tires presently being constructed and used on vehicles usually are switched from front to rear on the same side of the vehicle as recommended by tire manufacturers. Also, in present day procedures, tires are rotated or switched by placing the vehicle on a hoist and elevating the vehicle to an elevation approximately 6 ft. in height although this height can vary. Thus, the person rotating or switching the tires must remove the lugs holding one wheel, remove it from the hub, place it on the floor and roll it to the new location and then lift it and place it on another hub and replace the lug nuts. This procedure entails lifting and handling a relatively heavy tire and wheel assembly and individuals engaged in this type of lifting procedure have frequently been injured due to back strain, muscle strain and the like. In view of the weight of tire and wheel assemblies, various devices have been utilized to assist individuals in handling the tires and wheels when mounting and removing the tire and wheels assemblies in relation to vehicles. The following U.S. patents illustrate the development in this field of endeavor.

3,301,419
3,685,125
3,749,265
3,951,287
4,123,038

While the above patents disclose various types of lifts, carts and dollys for lifting and handling tires and wheels for mounting or removal from vehicles, the above patents do not disclose an arrangement in which tires and wheels on a hoisted vehicle can be "rotated" in which a swivelled support beam and a pair of swivelled supports are provided for two tires and wheels so that a first tire and wheel on the hub at one end of the vehicle can be removed with the device and the first tire and wheel then moved to a position adjacent the other end of the vehicle to remove a second tire and wheel thereon while supporting the first tire and wheel in an elevated but out-of-the-way position while the second tire and wheel is removed and the position of the tires and wheels is then switched so that the first tire and wheel is moved into position for attachment to the hub of the vehicle at the end of the vehicle from which the second tire and wheel was removed with the device then being moved to the original hub to place the second tire and wheel on the hub from which the first tire and wheel was removed.

SUMMARY OF THE INVENTION

An object of the present invention is to provide a tire and wheel handling device specifically adapted to receive and support a tire and wheel assembly removed from an elevated vehicle without the necessity of the individual removing the tire and wheel assembly manually lifting and handling the tire and wheel assembly.

Another object of the invention is to provide a tire and wheel handling device having a support structure that is swivelly mounted on a vertically adjustable and mobile stand with the support structure including a pair of cradles or supports to receive and support a pair of tire and wheel assemblies to enable a first support to support a first wheel as it is removed from a first hub at one end of the vehicle with the device then being moved to the other end of the vehicle with the first wheel being moved to an out-of-the-way position with the second support receiving and supporting a second wheel when it is removed from the hub with the support then being swivelled to place the first wheel on the second hub without having to lift and handle the first wheel. After the first wheel is mounted on the second hub, the device is moved back to a position to enable the second wheel to be mounted on the first hub without lifting or handling the second wheel thereby reducing the necessity of lifting and handling the tire and wheel assemblies which not only introduces less injury potential but also reduces the time required in rotating tires on a vehicle.

A further object of the invention is to provide a tire and wheel handling device as set forth in the preceding objects in which each of the supports is swivelly mounted on an elongated support beam or arm with the supports being rotatable or swivelled about spaced vertical axes and the center of the arm or beam being rotatable or swivelled about a vertical support axis from a support stand.

Still another object of the invention is to provide a tire and wheel handling device in accordance with the preceding objects in which each support is provided with a pair of transverse end rollers interconnected by side members with the rollers engaging the periphery of the tread of a tire in spaced relation to cradle the tire and the side members engaging the side walls of the tire and rim to maintain the tire and wheel assembly generally in vertical orientation thus facilitating alignment of the lug apertures in the rim with the studs on the hub to facilitate assembly of the tire and wheel on the hub.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a top plan view of the support structure.

FIGS. 4A–4D illustrate the sequence of operation followed when "rotating" or switching tire and wheel assemblies between the front and rear hubs on one side of a vehicle.

DESCRIPTION OF THE PREFERRED EMBODIMENT

Figure 1:
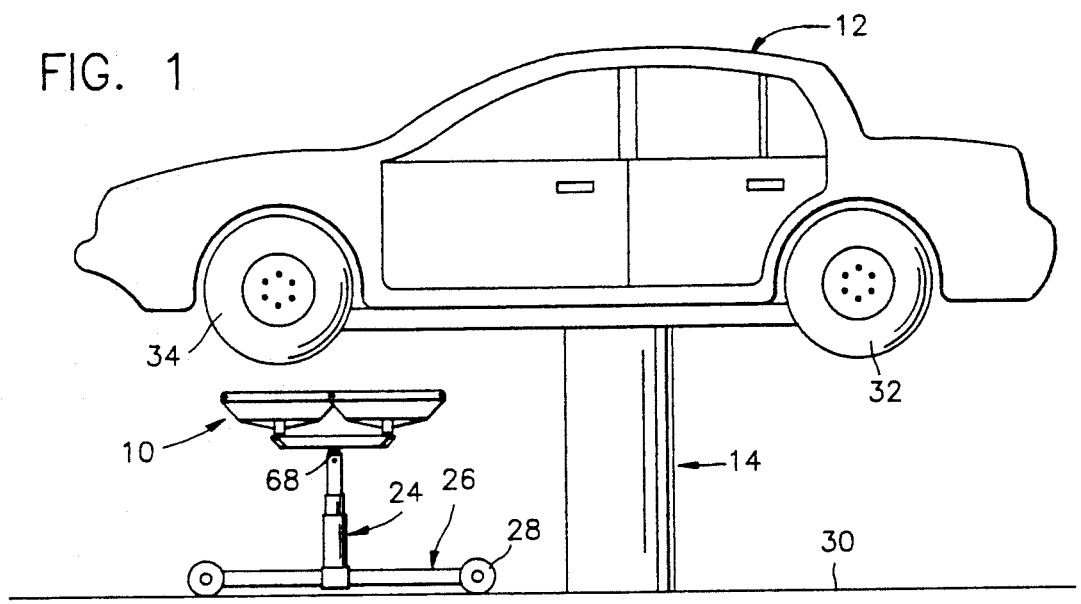
FIG. 1 is an elevational view of a vehicle on a hoist illustrating the tire and wheel handling device of the present invention positioned for use when elevated to engage a tire and wheel assembly.

As illustrated in FIG. 1, the vehicle tire and wheel lifting and handling device of the present invention is generally designated by reference numeral 10 and is associated with a vehicle such as a passenger car 12 supported on a conventional hydraulic lift or other suitable lift generally designated by reference numeral 14 which supports the vehicle in elevated position which is a conventional practice when servicing various components of the vehicle. The vehicle tire lifting and handling device 10 of the present invention is especially adapted for use in "rotating" or switching the tire and wheel assemblies from one position to another on the vehicle. In normal use of a vehicle, it is recommended that the tires be switched from one position to another, referred to as rotation of the tires, in order to obtain maximum tire life. With the radial tires now being used on vehicles, it is recommended that rotation be accomplished by retaining the tires on the same side of the vehicle by switching the front tires to the rear and the rear tires to the front. Usually, the tire and rim or wheel are switched as a unit from front to rear thus maintaining the same rotational direction of the tires rather than changing the rotational direction which would occur if the tires were switched from front to rear and to opposite sides of the vehicle. Also, it is conventional practice to place the vehicle on a lift device which supports the vehicle in an elevated position by engaging some portion of the vehicle other than the tires and wheels thus leaving the tires and wheels free to be removed and replaced. In doing so, the conventional practice is to remove one wheel when the vehicle is elevated, lower it to the ground, roll it to a new location, lift the tire and wheel and place it on the lugs and secure it in position. This lifting and handling requires substantial physical strength in view of the overall weight of the tire and wheel assemblies which frequently results in muscle or back injury since it is not only necessary to lift the tire and wheel assembly but also to turn it to align the openings in the wheel or rim with the lugs on the vehicle hub. The present invention eliminates the necessity of using physical strength to lift and handle the tire and wheel during "rotation" of the tire and wheels assemblies in relation to an elevated vehicle.

The tire and wheel lifting and handling device 10 includes a pair of spaced supports 16 and 18 which are supported at opposite ends of an elongated support beam generally designated by reference numeral 20 which has a centrally disposed bracket structure 22 depending therefrom for connection with a lift or hoist device 24 having a base 26 thereon provided with supporting wheels 28 to enable the device 10 to be rolled along a garage floor surface 30. The lift or hoist 24, base 26 and wheels 28 form a mobile stand and can be of any structural detail which will provide some degree of vertical adjustment of the support member 16 and also enable the device to be moved easily by rolling along the floor surface 30.

The vehicle 12 includes a rear tire and wheel assembly 32 and a front tire and wheel assembly 34 normally held in position on a rotatable hub by lug bolts and lug nuts in which the lug bolts extend through apertures 36 in the tire and wheel assembly in which the apertures 36 include a pattern corresponding to the pattern of the lug bolts on the hub. The construction of the tire and wheel assemblies and their connection to the vehicle is well known and conventional.

Each of the supports 16 and 18 are identical and include a bottom plate 38 of generally rectangular construction and provided with upwardly inclined end walls 40. The plate 38 also includes vertical side walls 44 which are in spaced parallel relation and rigid with the plate 38 and end walls 40. The upper and outer ends of the side walls 44 journal a pair of parallel rollers 46 supported by an axle or spindle 48 which extend through and journal the rollers 46 from the side walls 44. The spindle or axle may be in the form of an elongated bolt-like structure or one of the side walls 44 may be removably mounted to enable the projecting axle ends which may be rigid with roller 46 to be received in apertures in the side walls 44 during assembly. The two rollers 46 engage the peripheral tread 50 of the tire and wheel assembly at points spaced substantially from the bottom center of the tire and wheel assembly but below the horizontal center thereof in order to securely support the tire and wheel assembly in a vertical position with the side walls 44 engaging the inner and outer side walls of the tire and wheel assembly to maintain the tire and wheel assembly in vertically disposed position as illustrated in FIG. 2.

Figure 2:
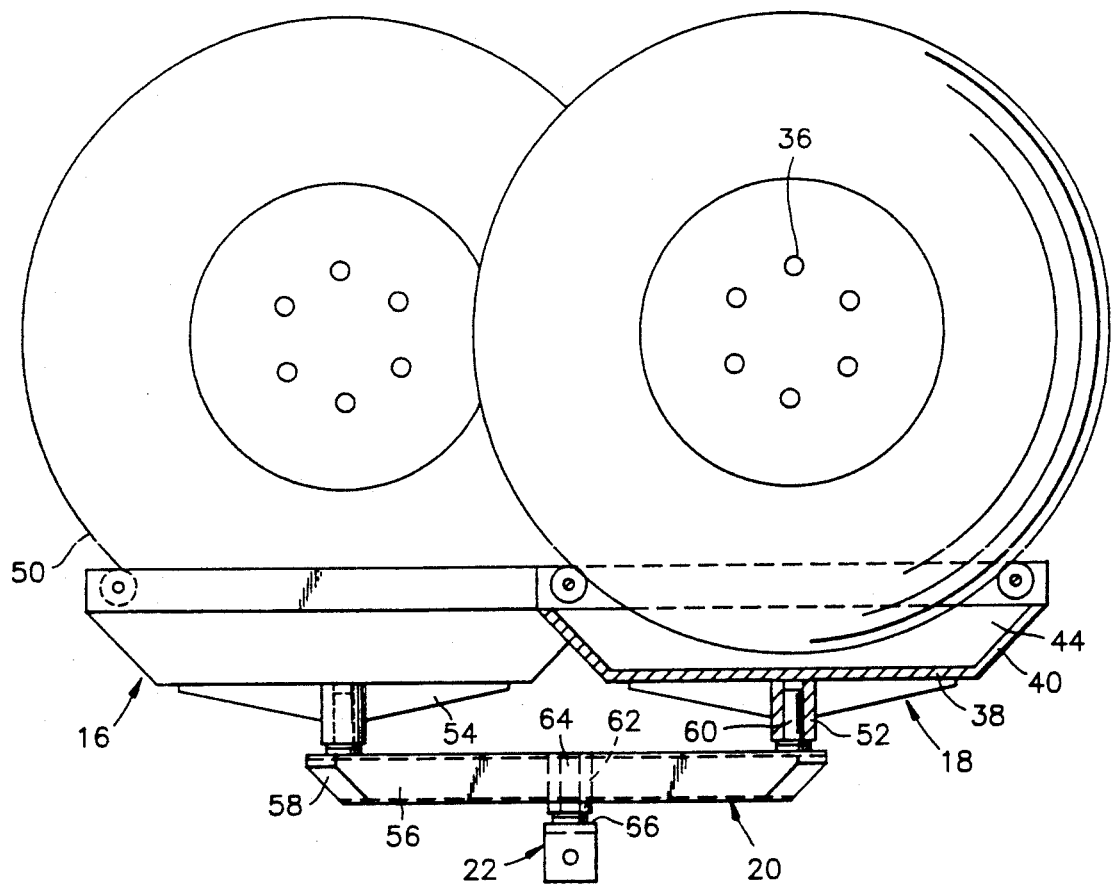
FIG. 2 is a side elevational view of the support structure with one of the cradles being illustrated in section.

The center bottom surface of the plate 38 is provided with a rigid depending sleeve 52 that is reinforced by gusset plates 54 radiating outwardly from the sleeve 52 to the corners of the plate 38 as illustrated in FIGS. 2 and 3. The support beam 20 is in the form of a hollow, rigid frame member 56 having inclined ends 58. Each end of the frame member or beam 56 is provided with a rigid, upstanding support pin or stud 60 that is telescopically and rotatably received in the sleeve 52 thus supporting the supports 16 and 18 for rotational movement about spaced vertical axes defined by the pins 60 and sleeves 52.

The frame or beam 56 is provided with a centrally disposed vertical sleeve 62 rotatably and telescopically receiving a pin or stud 64 extending upwardly from a bracket structure 66 that is connected to the upper end of a telescopic hoist or lift device by a pin or bolt 68 thus forming the bracket 22 connecting the beam 56 and supports 16 and 18 to a lifting or hoisting device 24 with the frame or beam 56 being rotatable about a central vertical axis and the supports 16 and 18 being rotatable about spaced vertical axes thus enabling the tire and wheel assemblies 32 and 34 to be rotated about the respective axes. If desired, the vertical pins and sleeves can be rotatably interconnected by a structure that will prevent vertical dislodgement such as a setscrew extending radially through the sleeve into a peripheral groove in the pin received therein which prevents accidental disassembly of the components but will enable disassembly when the setscrew is removed. The spaced relation between the rollers is such that tires having different outside diameters can be supported with the tire and wheel assemblies being rotatably supported by exerting rotational force on the tire and wheel assembly while being supported by the rollers 46 which support the periphery of the tire tread 50 from the plate 38. The spacing of the side walls 44 is such that tires having various transverse dimensions can be effectively supported in a generally vertical position or if relatively narrow tires are supported, the tires may be slightly inclined or a spacer block can be inserted between one sidewall of the tire and wheel assembly and the outer side plate.

FIGS. 4A-4D illustrate schematically the procedure used in rotating tires from front to rear on one side of a vehicle 12 with the reference numerals being those used in FIG. 1 with the elevated vehicle 12 including a front tire and wheel assembly 34 and a rear tire and wheel assembly 32 on the vehicle when it is lifted into position. The tire and wheel handling device is moved into position with the support 16 receiving the lower peripheral portion of the tire and wheel assembly 34. The lug nuts retaining the tire and wheel assembly 34 are removed and the rollers 46 support the tire and wheel assembly 34 as it is moved laterally off the wheel lugs by swinging the support 16 about the axis of pin 64 and/or moving the lift and hoist assembly 24 away from the vehicle by the use of the wheels 28 which may be caster wheels. The stand formed by the lift assembly 24 is then rolled to the rear of the vehicle with the beam 56 being rotated so that the support 18 is positioned under the rear tire and wheel assembly 32 and the front tire and wheel assembly 34 is oriented in generally spaced parallel relation to the support 18. The first step of the procedure is illustrated in FIG. 4 and the second step is illustrated in FIG. 4B with it being noted that there has been no necessity to lift the front tire and wheel assembly 34 from the wheel lugs and lower it to the garage floor surface 30 as is usual. Rather, the tire and wheel assembly 34 has been maintained in an elevated position and the outside of the tire and wheel assembly remains to the outside in relation to the vehicle as the supports 16 and 18 are switched in relation to each other with the support 18 then being adjacent the vehicle and positioned under and in engagement with the rear tire and wheel assembly 32. The lug nuts are then removed from the rear tire and wheel assembly if they were not removed at the same time that the front lug nuts were removed and the rear tire and wheel assembly 32 is supported by the rollers 46 on the support 18 and the rear tire and wheel assembly 32 is removed from the lug bolts by swinging the beam 56 and/or moving the lift or hoist 24 outwardly in relation to the vehicle. The position of the support 16 and 18 are again switched with the support 16 and the tire and wheel assembly 34 then being positioned inwardly and the tire and wheel assembly 34 is mounted on the lug bolts on the hub by pivotal movement of the beam 56 and/or inward movement of the lifting hoist 24 with alignment of the lug bolt holes 36 being obtained by any necessary rotation of the tire and wheel assembly 34 being accomplished by exerting rotational force on the tire and wheel assembly to cause it to rotate on the rollers 46. After the tire and wheel assembly 34 is mounted, the lug nuts are placed thereon to secure the front tire and wheel assembly 34 on the rear hub of the vehicle. The tire lifting and handling device 10 with the rear tire and wheel assembly 32 mounted thereon is then moved to the front of the vehicle and the position of the supports 16 and 18 is again switched with the support 18 and the rear tire and wheel assembly 32 being mounted on the front hub by swinging movement of the beam 56 and/or inward movement of the lifting hoist 24 to mount the rear tire and wheel assembly 32 on the front hub of the vehicle thus completing "rotation" of the tire and wheel assemblies from front to rear on the same side of the vehicle without either of the tire and wheel assemblies being lifted or lowered by an individual using muscular strength.

This device has the capability of supporting each of the tire and wheel assemblies as they are moved respectively from front to rear and rear to front in relation to the vehicle and support both of the tire and wheel assemblies while the tire and wheel assemblies are being switched in position at either the front or the rear of the vehicle depending upon whether the procedure started at the front wheel or at the rear wheel. This substantially reduces the time and effort required in efficiently rotating tire and wheel assemblies in relation to a vehicle while maintaining the outside side wall of the tire and wheel assembly in outwardly facing position in relation to the vehicle. While the device is especially useful in rotating tires on the same side of the vehicle, it can also be used to rotate tires to opposite sides of a vehicle if desired.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A vehicle tire and wheel lifting and handling device comprising a pair of spaced supports, means facing upwardly on each support to engage and support a lower peripheral portion of a vehicle wheel, frame means supporting each of said supports for rotational movement about vertical axes and means supporting a central portion of said frame means to support the frame means for rotational movement about a vertical axis disposed centrally between the vertical axes of the supports to enable a first vehicle tire and wheel assembly to be engaged by a support while the first tire and wheel assembly is mounted at an original location on a vehicle with the first tire and wheel assembly being removed from the vehicle and supported on the support with the support and first tire and wheel assembly then being moved to a position to enable the support spaced from the first tire and wheel assembly to be engaged with and support a second tire and wheel assembly mounted on the vehicle to enable the second tire and wheel assembly to be removed from the vehicle and supported on the device with the first tire and wheel assembly then being moved into position for mounting on the vehicle where the second tire and wheel assembly was removed from with the second tire and wheel assembly then being moved along with the device back to the original location of the first tire and wheel assembly with the second tire and wheel assembly being mounted on the vehicle where the first tire and wheel assembly was removed without the tire and wheel assemblies being manually lifted and handled during rotation of the tire and wheel assemblies in relation to a vehicle.

2. The device as defined in claim 1 wherein each support includes a pair of generally parallel spaced side walls receiving a lower peripheral portion of a tire and wheel assembly therebetween, a pair of spaced parallel rollers rotatably journaled between end portions of the side walls for engaging a peripheral tread of a tire and wheel assembly in spaced relation to a bottom center point thereof and in spaced relation to a horizontal center point of the tire and wheel assembly thus enabling rotation of a supported tire and wheel assembly to align lug bolt openings with lug bolts on a vehicle hub.

3. The device as defined in claim 2 wherein said frame means includes an elongated beam, said means supporting the supports from the beam including an upstanding pin rigid with each outer end portion of the beam, each support including a bottom plate having a depending vertical sleeve disposed centrally thereon with the sleeve telescopically and rotatably receiving a pin on said beam thereby rotatably supporting the supports from the beam for rotational movement about spaced vertical axes.

4. The device as defined in claim 3 wherein said means supporting the frame means includes a mobile hoist structure, said beam including a centrally disposed vertical sleeve oriented centrally between the pins, a bracket structure including a vertically disposed pin rigid with the bracket structure and received in the sleeve for supporting the beam for rotational movement about a vertical axis.

5. The device as defined in claim 4 wherein the supports are spaced sufficiently apart to enable the supports and tire and wheel assemblies supported thereon to be switched in position in relation to each other when each of the supports has a tire and wheel assembly mounted thereon with the tire and wheel assemblies being in staggered relation to each other when removing and remounting the tire and wheel assemblies in relation to hubs on the vehicle.

* * * * *